United States Patent
Yasutomi et al.

(10) Patent No.: US 9,243,961 B2
(45) Date of Patent: Jan. 26, 2016

(54) IN-FURNACE TEMPERATURE MEASUREMENT DEVICE

(75) Inventors: Toshinori Yasutomi, Kitakyushu (JP); Kazuo Okazaki, Ashiya (JP); Masaru Yamana, Kobe (JP); Toshiyuki Saijo, Kobe (JP); Takao Michinoshita, Kobe (JP)

(73) Assignees: Electric Power Development Co., Ltd., Tokyo (JP); Okazaki Manufacturing Company, Kobe-shi (JP)

( * ) Notice: Subject to any disclaimer, the term of this patent is extended or adjusted under 35 U.S.C. 154(b) by 255 days.

(21) Appl. No.: 14/126,783

(22) PCT Filed: Mar. 2, 2012

(86) PCT No.: PCT/JP2012/055392
§ 371 (c)(1),
(2), (4) Date: Dec. 16, 2013

(87) PCT Pub. No.: WO2013/021671
PCT Pub. Date: Feb. 14, 2013

(65) Prior Publication Data
US 2014/0105249 A1    Apr. 17, 2014

(30) Foreign Application Priority Data
Aug. 11, 2011  (JP) ................................. 2011-176144

(51) Int. Cl.
*G01K 1/08*    (2006.01)
*G01K 1/14*    (2006.01)

(52) U.S. Cl.
CPC . *G01K 1/08* (2013.01); *G01K 1/146* (2013.01)

(58) Field of Classification Search
CPC ................................... G01K 1/12; G01K 1/14
USPC ......... 374/208, 141, 163, 179, 185, 100, 143; 73/863.81, 866.5; 136/200; 604/221
See application file for complete search history.

(56) References Cited

U.S. PATENT DOCUMENTS

| 4,471,664 A * | 9/1984 | Mailliet | C21B 7/24 73/863.11 |
| 2015/0185084 A1* | 7/2015 | Hatlen | G01K 1/08 374/208 |

FOREIGN PATENT DOCUMENTS

| JP | 52-44568 Y2 | 10/1977 | |
| JP | 59-50324 A | 3/1984 | |
| JP | 59050324 A * | 3/1984 | ............. G01K 13/00 |
| JP | 4-21931 U | 2/1992 | |
| JP | 5-28945 U | 4/1993 | |
| JP | 9-126907 A | 5/1997 | |
| JP | 2005-43057 A | 2/2005 | |

* cited by examiner

*Primary Examiner* — Laura Martin
*Assistant Examiner* — Jean Morello
(74) *Attorney, Agent, or Firm* — Birch, Stewart, Kolasch & Birch, LLP

(57) ABSTRACT

The present invention relates to an in-furnace temperature measurement device 1 for a furnace in which gas is generated. The measurement device 1 includes: a support tube 3 which communicates with a measurement hole 2A which leads to an inside of the furnace; a sensor protection tube 4 inserted into the support tube 3 so as to be movable in an axial direction with a leading end, of the sensor protection tube 4, facing a furnace side; a plurality of seal rings 6A and 6B which hermetically seal a gap between the support tube 3 and the sensor protection tube 4 and which are arranged at an interval so as to divide the gap into a plurality of space portions in the axial direction; a temperature sensor 5 housed in the sensor protection tube 4 such that a temperature-sensing portion of the temperature sensor 5 corresponds to a leading-end portion of the sensor protection tube 4; and a drive mechanism 7 which drives the leading-end portion of the sensor protection tube 4 so as to be able to advance and retract in the axial direction with respect to the inside of the furnace through the measurement hole 2A, while maintaining a sealed state by the seal rings 6A and 6B.

6 Claims, 7 Drawing Sheets

IN-FURNACE TEMPERATURE MEASUREMENT DEVICE

TECHNICAL FIELD

The present invention relates to an in-furnace temperature measurement device for a furnace in which gas is generated.

BACKGROUND ART

In combustion furnaces which burn, at high temperatures, solid hydrocarbon fuel obtained through pyrolysis of coal, coke, biomass, industrial wastes, and the like, and in gasification furnaces which gasify the solid hydrocarbon fuel, the temperature in the furnace needs to be controlled at an optimum temperature based on a measurement value of the in-furnace temperature, in order to appropriately advance the reaction in the furnace. The optimum temperature is about 1300 to 1600° C., which is a very high temperature.

Further, in combustion furnaces and gasification furnaces of this type, highly corrosive gas or molten ash of solid fuel is generated.

In particular, in coal gasification furnaces, the in-furnace temperature becomes about 1600° C., which is a high temperature that would not be seen in conventional industrial facilities, and in addition, the in-furnace pressure becomes about 2.5 MPa, which is a very high pressure. Further, slag containing a large amount of reductive carbon is present in the furnace, and this causes highly corrosive gas atmosphere in the furnace, in conjunction with the high temperature environment.

Therefore, combustion furnaces and gasification furnaces in which gas is generated need hermetical-type in-furnace temperature measurement devices that can measure the in-furnace temperature without leaking atmospheric gas in the furnace.

Conventionally, such a hermetical-type in-furnace temperature measurement device includes a support tube connected to a measurement hole which leads to the inside of the furnace, and a sensor protection tube which includes therein a temperature sensor composed of a thermocouple. In the hermetical-type in-furnace temperature measurement device, the protection tube is hermetically housed in the support tube such that a leading-end portion of the sensor protection tube corresponding to a temperature-sensing portion of the temperature sensor is always exposed in the furnace (for example, see Patent Literature 1 and 2).

CITATION LIST

Patent Literature

[PTL 1] Japanese Laid-Open Patent Publication No. 2005-43057
[PTL 2] Japanese Laid-Open Utility Model Publication No. H5-28945

SUMMARY OF THE INVENTION

Problems to be Solved by the Invention

In the above conventional in-furnace temperature measurement devices, the sensor protection tube is housed so as not to be able to move in the axial direction relative to the support tube, and the leading-end portion of the sensor protection tube is always exposed in the furnace. Thus, there are cases the leading-end portion of the sensor protection tube deteriorates in a relatively short time period and the sensor protection tube needs to be replaced soon.

In particular, in a coal gasification furnace, since the temperature is high, the pressure is high, and highly corrosive atmosphere is present as described above, deterioration of the leading-end portion of the sensor protection tube is very easy to advance. Thus, there has been a problem of how the durability of the sensor protection tube is improved compared with that of an ordinary combustion furnace.

The present invention has been made in view of the above problem. An object of the present invention is to realize a long life of a sensor protection tube in a hermetical-type in-furnace temperature measurement device and a hermetical-type in-furnace temperature measurement method for measuring an in-furnace temperature while sealing atmospheric gas in the furnace.

Solution to the Problems

An in-furnace temperature measurement device (hereinafter, may be simply referred to as "measurement device") of the present invention is an in-furnace temperature measurement device for a furnace in which gas is generated, the in-furnace temperature measurement device including: a support tube which communicates with a measurement hole which leads to an inside of the furnace; a sensor protection tube inserted into the support tube so as to be movable in an axial direction with a leading end, of the sensor protection tube, facing a furnace side; a plurality of seal rings which hermetically seal a gap between the support tube and the sensor protection tube and which are arranged at an interval so as to divide the gap into a plurality of space portions in the axial direction; a temperature sensor housed in the sensor protection tube such that a temperature-sensing portion of the temperature sensor corresponds to a leading-end portion of the sensor protection tube; and a drive mechanism which drives the leading-end portion of the sensor protection tube so as to be able to advance and retract in the axial direction with respect to the inside of the furnace through the measurement hole, while maintaining a sealed state by the seal rings.

According to the measurement device of the present invention, the drive mechanism drives the leading-end portion of the sensor protection tube so as to be able to advance and retract in the axial direction with respect to the inside of the furnace through the measurement hole, while maintaining a sealed state by the seal members. Therefore, the leading-end portion of the sensor protection tube can be advanced into and retract from the furnace without leaking gas atmosphere in the furnace to the outside.

Therefore, by causing the leading-end portion of the sensor protection tube to protrude into the furnace only when temperature measurement is necessary, and by causing the leading-end portion of the sensor protection tube to be withdrawn to a standby position outside the furnace for the other period of time, a long life of the sensor protection tube can be realized.

Further, according to the measurement device of the present invention, a plurality of seal rings are arranged at an interval in the axial direction so as to divide the gap between the support tube and the sensor protection tube into a plurality of space portions in the axial direction. Therefore, compared with a case where a single seal ring is used, relative movement in the axial direction of the sensor protection tube relative to the support tube is smoothly performed without causing any trouble. Thus, it is advantageous in that advancement and retraction of the sensor protection tube by the drive mechanism can be performed more assuredly.

Preferably, the measurement device of the present invention further includes a gas flowing mechanism which causes inert gas having a higher pressure than an in-furnace pressure to flow into each of the space portions which are positioned on the furnace side of the respective seal rings.

In this case, the gas flowing mechanism causes inert gas having a higher pressure than the in-furnace pressure to flow into each of the space portions which are positioned on the furnace side of the respective seal rings. Therefore, if the plurality of seal rings and the plurality of space portions are numbered as the first, the second, . . . , in order from the side nearer to the furnace, inert gas which flows in the first space portion enters the furnace from the space portion through the measurement hole.

Accordingly, damage of the first seal ring caused by being directly exposed to the gas atmosphere in the furnace can be prevented in advance.

Further, in this case, the inert gas having a higher pressure than the in-furnace pressure is caused to flow also in the second space portion and thereafter. Therefore, even if the seal ring in the previous stage is damaged, the seal ring in the next stage maintains the sealed state between the support tube and the sensor protection tube. Thus, gas leak from the inside of the furnace can be assuredly prevented.

It should be noted that the inert gas flowing in each of the space portions also has a function of air-cooling the support tube and the sensor protection tube, and accordingly, thermal damage of each of the seal rings can be effectively prevented.

In the measurement device of the present invention, preferably, the leading-end portion of the sensor protection tube has a corrosion resistance higher than that of a body part of the sensor protection tube, the body part being a part of the sensor protection tube other than the leading-end portion, and is formed by a cover cylinder which can be coaxially and detachably mounted to the body part.

In this case, since the cover cylinder has a higher corrosion resistance than that of the body part, durability of the leading-end portion of the sensor protection tube exposed in the furnace during temperature measurement is improved. Further, even if the cover cylinder is damaged, it is sufficient to remove the damaged cover cylinder from the body part to be replaced. Thus, compared with a case where the entirety of the sensor protection tube is replaced, maintenance costs of the measurement device can be reduced.

Further, preferably, the measurement device of the present invention further includes a seal chamber which hermetically isolates a base end side opening of the gap from outside, and the gas flowing mechanism has a flow path which allows the inert gas to flow also in the seal chamber.

In this case, the gas flowing mechanism causes the inert gas having a higher pressure than the in-furnace pressure to flow also in the seal chamber which isolates, from the outside, the base end side opening of the gap between the support tube and the sensor protection tube. Therefore, gas leak from the base end side opening of the gap can be prevented almost completely.

In the measurement device of the present invention, preferably, the seal rings are formed from any one of fluorocarbon rubber, silicone rubber, chloroprene rubber, and nitrile rubber.

The reason for this is as follows. The upper limit values of the usable temperature ranges of these elastomer materials are at least 100° C. or more, and are relatively higher than those of other elastomer materials. Therefore, if such an elastomer material is employed as the seal material inside the support tube which is likely to have a high temperature due to the gas atmosphere and heat conduction from the inside of the furnace, a long life can be expected.

Further, in this case, preferably, the seal rings are provided at positions, in the axial direction of the sensor protection tube, where temperatures are lower than or equal to an upper limit value of a usable temperature range of an elastomer material employed for the seal rings.

If the seal rings are provided at the above-described positions in the axial direction, the temperature of the employed elastomer material does not exceed the usable temperature range thereof during the operation of the measurement device. Thus, it is possible to prevent in advance the seal rings from being damaged soon by being exposed to a high temperature higher or equal to the upper limit value.

Further, in the measurement device of the present invention, preferably, the seal rings are each formed by a plurality of rubber rings provided adjacent to each other in the axial direction.

In this case, since the seal rings defining space portions are each formed by double or more rubber rings, airtightness between the space portions can be more assuredly enhanced than in a case where the seal rings are each formed by one rubber ring.

Advantageous Effects of the Invention

As described above, according to the present invention, the leading-end portion of the sensor protection tube can be advanced into and retracted from the furnace without leaking the atmospheric gas in the furnace to the outside. Therefore, by causing the leading-end portion of the sensor protection tube to protrude into the furnace only when temperature measurement is necessary, and by causing the leading-end portion of the sensor protection tube to be withdrawn to a standby position outside the furnace for the other period of time, a long life of the sensor protection tube can be realized.

DESCRIPTION OF EMBODIMENTS

Hereinafter, an embodiment of the present invention will be described with reference to the drawings.

[Overall Structure of Measurement Device]

Figure 1:
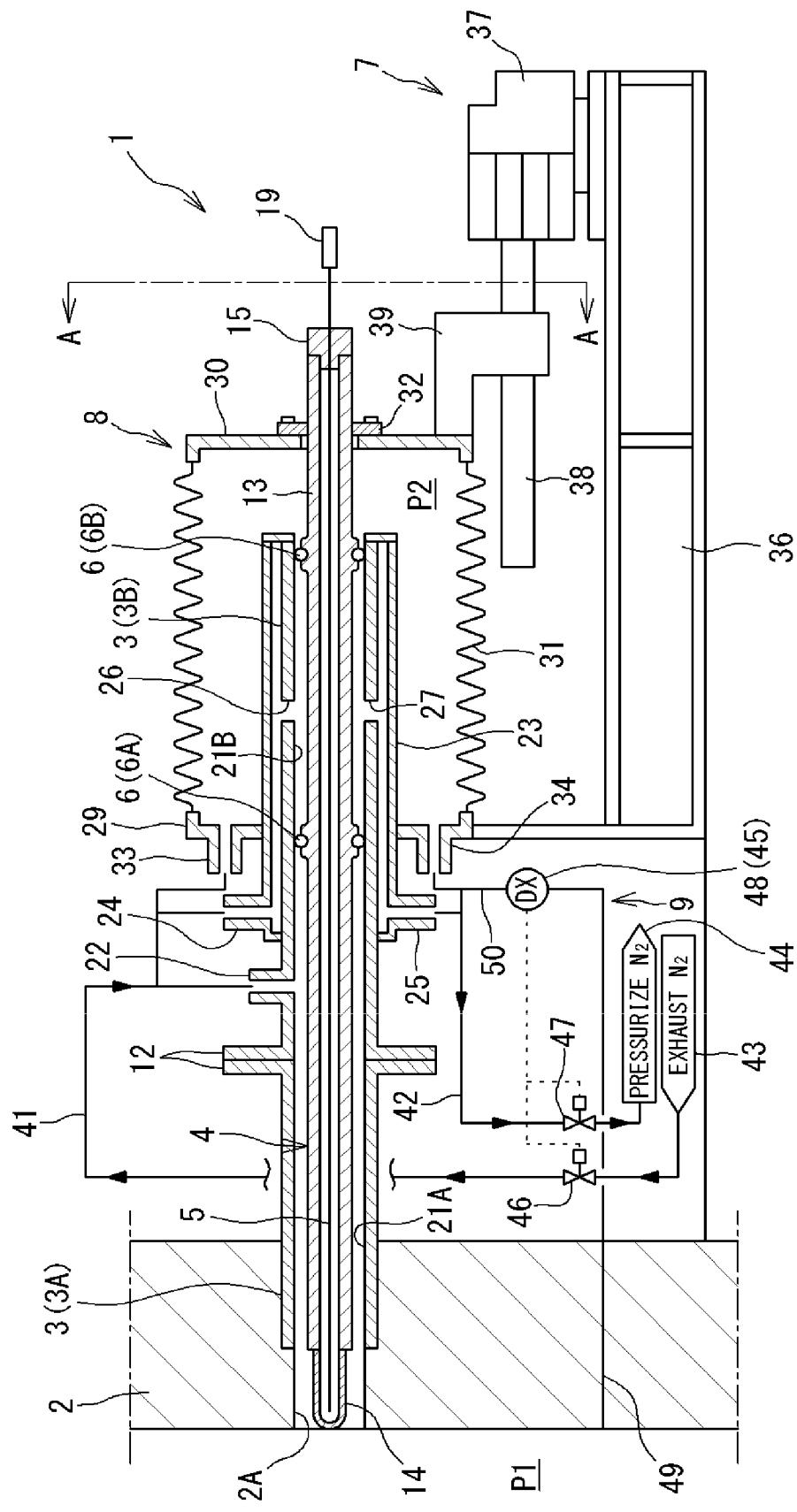
FIG. 1 is a side cross-sectional view of an in-furnace temperature measurement device according to an embodiment of the present invention, and shows a state where a sensor protection tube is at a standby position.
Figure 2:
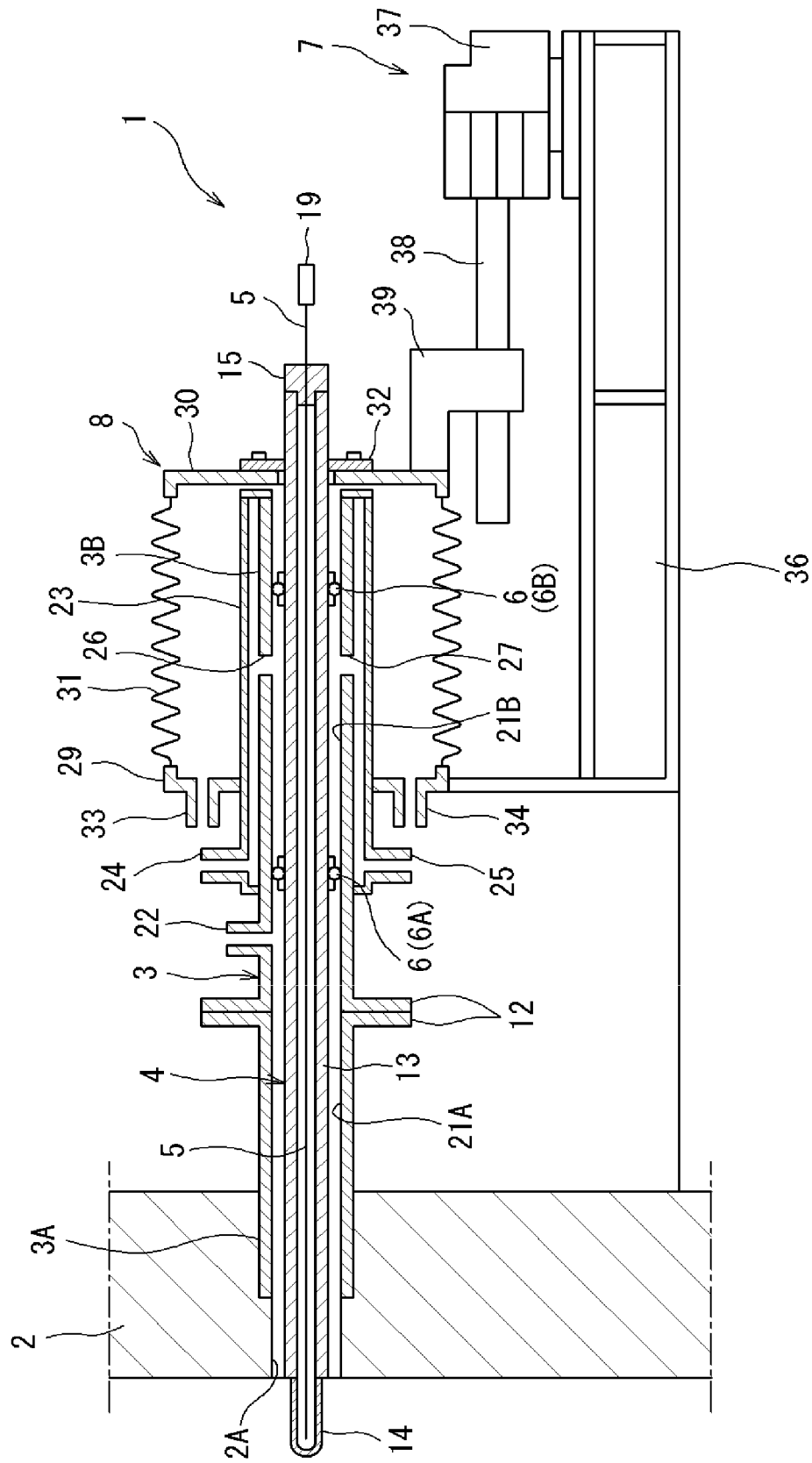
FIG. 2 is a side cross-sectional view of the in-furnace temperature measurement device and shows a state where the sensor protection tube is at a temperature-measuring position.

Each of FIG. 1 and FIG. 2 is a side cross-sectional view of an in-furnace temperature measurement device 1 according to an embodiment of the present invention. FIG. 1 shows a state where a sensor protection tube 4 is at a standby position, and FIG. 2 shows a state where the sensor protection tube 4 is at a temperature-measuring position.

Herein, the left side in FIG. 1 and FIG. 2 is referred to as the "furnace side" or "leading end side", and the right side in FIG. 1 and FIG. 2 is referred to as the "furnace-opposite side" (which means the side opposite to the furnace) or "base end side". In FIG. 2, a gas flowing device 9 is omitted to simplify the view.

The measurement device 1 of the present embodiment is a "hermetical-type" measurement device that can measure an in-furnace temperature while hermetically sealing the atmospheric gas in the furnace. As shown in FIG. 1 and FIG. 2, the measurement device 1 includes: a support tube 3 mounted to an outer surface of a furnace wall 2 of a coal gasification furnace; the sensor protection tube 4 inserted into the support tube 3 so as to be movable in the axial direction (left-right direction in FIG. 1); and a temperature sensor 5 housed in the protection tube 4.

Further, the measurement device 1 includes: a seal member 6 which hermetically seals the gap between the support tube 3 and the sensor protection tube 4; and a driving device 7 which drives the sensor protection tube 4 so as to be able to advance and retract in the axial direction while maintaining a sealed state.

Further, the measurement device 1 includes: a seal chamber 8 which is expandable in the axial direction and which hermetically isolates, from the outside, a base end side opening of the gap between the support tube 3 and the sensor protection tube 4; and the gas flowing device 9 which causes inert gas having a high pressure to flow into the support tube 3 and the seal chamber 8 (see FIG. 1).

A coal gasification furnace to which the measurement device 1 of the present embodiment is mounted is a component in plant facilities such as an integrated coal gasification combined cycle (IGCC), an integrated coal gasification fuel cell combined cycle (IGFC), or the like. In the coal gasification furnace, oxygen or air is supplied under pressure so as to partially oxidize coal in the furnace, thereby generating coal gas whose principal components are CO and H2.

Coal gas generated in the coal gasification furnace is sent to a gas purification device in a subsequent stage where impurities are removed from the coal gas, and then, the resultant coal gas is supplied as fuel for a gas turbine and the like, whereby combined cycle power generation is performed.

[Support Tube, Sensor Protection Tube, and Temperature Sensor]

Among the above component members of the measurement device 1, the support tube 3 is formed by a tube member that is hollow and circular in its cross section. The support tube 3 is composed of: a furnace wall tube part 3A mounted in a cantilever manner to the outer surface of the furnace wall 2; and a connection tube part 3B which is connected to an end of the furnace wall tube part 3A, the furnace wall tube part 3A and the connection tube part 3B being provided so as to coaxially communicate with a measurement hole 2A in the furnace wall 2. Each of the tube parts 3A and 3B integrally includes a joint flange 12 at an end of the tube.

The tube parts 3A and 3B are coaxially jointed together by their joint flanges 12 and 12 being fastened together with bolts such that inner peripheral surfaces of the tube parts 3A and 3B are continued to each other in the axial direction.

The sensor protection tube 4 is formed by a tube member that is hollow and circular in its cross section, that has an outer diameter smaller than the inner diameter of the support tube 3, and that has a length greater than that of the support tube 3. The inside of the sensor protection tube 4 serves as space for housing the temperature sensor 5.

The sensor protection tube 4 includes a body part 13 which is a predominant part of the protection tube 4, a cover cylinder 14 provided on the leading end side (left side in FIG. 1) of the body part 13, and an attachment plug 15 provided on the base end side (right side in FIG. 1) of the body part 13.

Among these, the body part 13 is formed from a metal material (for example, 50Co-30Cr-20Fe) having a higher heat resistance than that of stainless steel. The cover cylinder 14 which is directly exposed in the furnace is formed from a metal material (for example, pure chromium) having a higher corrosion resistance to atmospheric gas in the coal gasification furnace than that of the body part 13.

Examples of a material proved to be resistant to gas atmosphere, as in the coal gasification furnace or the like, whose temperature is very high (about 1600° C.) and that is highly corrosive due to reduction include iridium and ceramics in addition to pure chromium. Therefore, the cover cylinder 14 may be formed from these materials.

It should be noted that, as a result of actually exposing the above materials in a high pressure atmospheric gas in a coal gasification furnace and examining the durability of each material, iridium lost the isolating function as the protection tube 4 within one day, ceramics lost the isolating function in about one week, but pure chromium maintained the isolating function for two weeks or more.

Therefore, with respect to atmospheric gas in the coal gasification furnace, pure chromium is most preferable as the material of the cover cylinder 14 forming the leading-end portion of the sensor protection tube 4.

Further, the body part 13 need not be necessarily foamed from a metal material having a high heat resistance for all of its length. For example, only a portion, of the body part 13, that is near to the furnace wall 2 and whose temperature during temperature measurement becomes 100 to 1000° C. may be formed from such a material, and the other portion, of the body part 13, whose temperature during temperature measurement becomes 100° C. or lower may be formed from an inexpensive SUS material (for example, SUS 316). Then, axial ends of these portions may be connected to each other to be integrated.

As a result, production costs can be more reduced than in a case where the entirety of the body part 13 is formed from a metal material having a high heat resistance.

The cover cylinder 14 of the present embodiment has, in its base end portion, a coupling portion for threaded engagement by use of set screws or the like. By the coupling portion being coaxially and threadedly engaged with a leading end opening of the body part 13, the cover cylinder 14 can be detachably attached to the body part 13.

Accordingly, even in a case where the cover cylinder 14 is damaged due to atmospheric gas in the furnace and the leading-end portion of the sensor protection tube 4 loses the isolating function, it is sufficient to replace only the cover cylinder 14, and the body part 13 can also be used thereafter.

The attachment plug 15 is formed by a compression fitting or the like that hermetically closes a base end opening of the body part 13. The base end portion of the temperature sensor 5 is coupled to the attachment plug 15, by being passed therethrough.

The temperature sensor 5 is formed by an elongated thermocouple that extends inside the sensor protection tube 4 for substantially the entire length thereof. The temperature sensor 5 extends from the pass-through portion of the attachment plug 15 to the vicinity at the leading end of the cover cylinder 14. A temperature-sensing portion of the temperature sensor 5 is arranged at a position corresponding to the cover cylinder 14 which forms the leading-end portion of the sensor protection tube 4.

Figure 4:
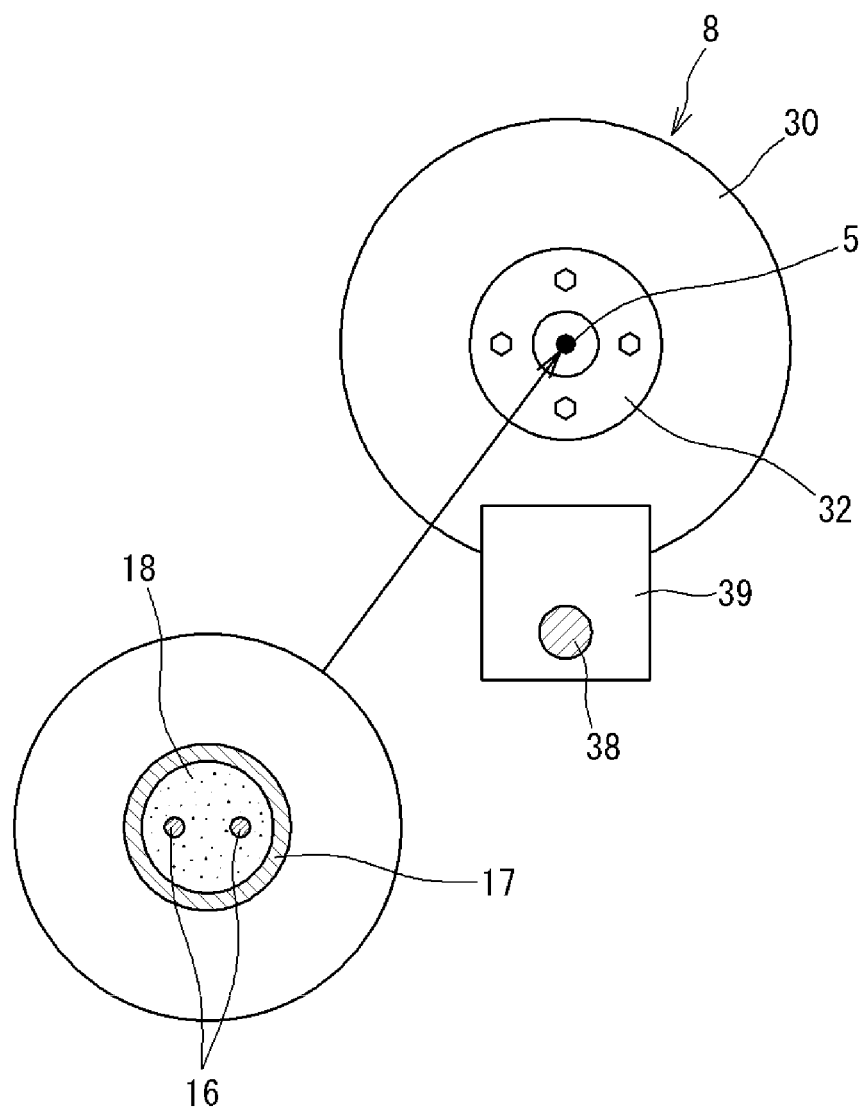
FIG. 4 is a front view of the in-furnace temperature measurement device viewed from the A direction indicated in FIG. 1.

As shown in FIG. 4, the temperature sensor 5 of the present embodiment is formed by a sheathed thermocouple in which a pair of electrothermal wires 16, 16 provided at a certain interval and in parallel with each other are housed in a sheath tube (metal-coated tube) 17. The sheath tube 17 is filled with an inorganic insulation material 18.

Also with respect to the sheath tube 17 and the electrothermal wires 16 which are component materials of the sheathed thermocouple, in consideration of temperature distribution in the axial direction in the sensor protection tube 4 during temperature measurement, component materials having different heat resistance performances may be employed for respective predetermined ranges in the axial direction, and axial ends of these component materials may be connected to each other to be integrated.

The base end portion of the temperature sensor 5 is exposed to the outside of the sensor protection tube 4, from the pass-through portion of the attachment plug 15, and is connected, via a coupler 19 provided at this exposed portion, to a combustion control section (not shown) of the coal gasification furnace.

The combustion control section calculates an in-furnace temperature based on a voltage change detected by the temperature sensor 5, and increases or decreases the combustion amount in the coal gasification furnace such that the in-furnace temperature approaches an optimum temperature (about 1600° C.), thereby performing feedback control of the in-furnace temperature.

[Seal Member and Seal Chamber]

As shown in FIG. 1 and FIG. 2, the seal member 6 of the present embodiment includes a plurality of (two in the example shown in FIG. 1 and FIG. 2) seal rings 6A and 6B, arranged at an interval in the axial direction.

The two seal rings 6A and 6B are each formed by a rubber ring of fluorocarbon rubber whose heatproof temperature is about 150° C., for example, and divide the gap between the support tube 3 and the sensor protection tube 4 into a plurality of space portions 21A and 21B in the axial direction.

Hereinafter, among the two seal rings 6A and 6B, the seal ring nearer (left side in FIG. 1) to the furnace will be referred to as a first seal ring 6A, and the next seal ring will be referred to as a second seal ring 6B.

Further, among the two space portions 21A and 21B respectively positioned on the furnace side of the seal rings 6A and 6B, the space portion nearer to the furnace will be referred to as a first space portion 21A, and the space portion farther from the furnace will be referred to as a second space portion 21B.

The connection tube part 3B of the support tube 3 is provided with a gas supply port 22, and the supply port 22 communicates with the first space portion 21A.

Further, the connection tube part 3B of the support tube 3 is hermetically covered with a gas flowing tube 23 having a cylindrical shape. The flowing tube 23 covers the connection tube part 3B in the range in the axial direction from the vicinity on the base end side of the gas supply port 22 to the base end edge of the connection tube part 3B, and includes an intake port 24 and an exhaust port 25 at an end on the furnace side thereof. A portion, within the gas flowing tube 23, of the connection tube part 3B is provided with an intake hole 26 and an exhaust hole 27. The holes 26 and 27 communicate with the second space portion 21B.

Figure 3:
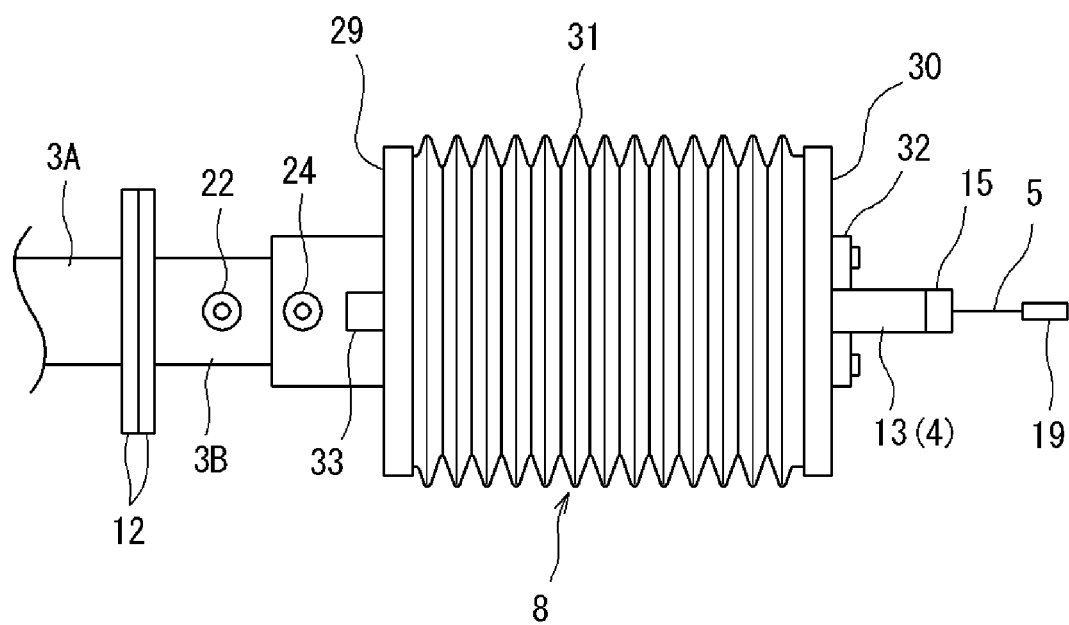
FIG. 3 is a plan view of a base end side portion of the in-furnace temperature measurement device.

As shown in FIG. 1 to FIG. 3, the seal chamber 8 includes a fixed wall portion 29 having a disk-like shape and provided nearer to the furnace, a movable wall portion 30 having a disk-like shape and provided farther from the furnace, and an expandable cylinder 31 which is expandable in the axial direction and whose both ends in the axial direction are respectively attached to the wall portions 29 and 30.

The fixed wall portion 29 is fixed to a mount 36 of the driving device 7 described later. To a lower end of the movable wall portion 30, a linear slider 39 of the driving device 7 is attached. Therefore, when the linear slider 39 moves in the axial direction, the relative distance in the axial direction of the movable wall portion 30 relative to the fixed wall portion 29 changes, whereby the expandable cylinder 31 expands and contracts in the axial direction.

The gas flowing tube 23 hermetically passes through a center portion of the fixed wall portion 29, and the base end side portion, relative to this pass-through portion, of the gas flowing tube 23 is housed in the seal chamber 8.

Accordingly, the base end side opening of the gap between the support tube 3 and the sensor protection tube 4, i.e., a space portion, of the gap, that is open to the furnace-opposite side (right side in FIG. 1) viewed from the second seal ring 6B is hermetically isolated from the outside by means of the seal chamber 8.

The base end portion of the sensor protection tube 4 passes through a center portion of the movable wall portion 30 and protrudes to the outside of the seal chamber 8, and to this protruding end, an attachment flange 32 is fixed.

The attachment flange 32 is fastened with bolts to an outer surface of the movable wall portion 30, whereby the center portion of the movable wall portion 30 is hermetically closed by means of the attachment flange 32. Accordingly, when the movable wall portion 30 moves in the axial direction by means of the linear slider 39, the sensor protection tube 4 also moves in the same direction in the axial direction, associated therewith.

It should be noted that an intake port 33 and an exhaust port 34 are formed in the furnace side surface of the fixed wall portion 29 of the seal chamber 8.

The expandable cylinder 31 of the present embodiment is formed by a hollow cylinder of a bellows structure, and the bellows cylinder is formed from a heat resistant rubber material or a thin stainless steel material, for example.

However, the expandable cylinder 31 is not necessarily limited to that of a bellows structure, and may have an internal and external dual cylinder structure (not shown) in which an inner cylinder is inserted in an outer cylinder hermetically and slidably in the axial direction.

[Driving Device]

As shown in FIG. 1 and FIG. 2, the driving device (drive mechanism) 7 includes the mount 36 placed on the floor, a motor 37 provided on the mount 36, an output shaft 38 which is driven by the motor 37 so as to rotate, and the linear slider 39 which moves along the output shaft 38.

The output shaft 38 is formed by a ball screw which extends in parallel to the axis of the support tube 3 and the sensor protection tube 4. The ball screw 38 is threadedly engaged with a threaded hole formed in a wall portion on the base end side of the linear slider 39.

Accordingly, when the motor 37 is operated to rotate the output shaft 38 in a normal direction about the axis thereof, the linear slider 39 moves to the furnace side (left side in FIG. 1), and when the output shaft 38 is rotated in the reverse direction, the linear slider 39 moves to the furnace-opposite side (right side in FIG. 1).

[Gas Flowing Device]

As shown in FIG. 1, the gas flowing device (gas flowing mechanism) 9 includes a supply pipeline system 41 which supplies inert gas (nitrogen gas in the present embodiment) to each of the space portions 21A and 21B in the support tube 3 and the seal chamber 8, and a discharge pipeline system 42 which discharges the supplied inert gas, from the space portion 21B and the seal chamber 8 to the outside.

Among these, the upstream end of the supply pipeline system 41 is connected to a compressor 43 for inert gas, and the supply pipeline system 41 is branched into three on its downstream side. The downstream ends of the three branch pipes are respectively connected to the gas supply port 22, the intake port 24, and the intake port 33.

The downstream end of the discharge pipeline system 42 is connected to a drain chamber 44 for inert gas, and the discharge pipeline system 42 is branched into two on its upstream side. The upstream ends of the two branch pipes are respectively connected to the exhaust port 25 and the exhaust port 34.

Accordingly, the inert gas coming out of the compressor 43 is supplied, through the supply pipeline system 41, to the gas supply port 22 of the support tube 3, the intake port 24 of the gas flowing tube 23, and the intake port 33 of the seal chamber 8.

Since there is no exhaust port in the first space portion 21A within the support tube 3, the inert gas supplied from the gas supply port 22 flows to the leading end side in the axial direction inside the first space portion 21A, and flows into the furnace from the leading end side opening of the space portion 21A via the measurement hole 2A.

On the other hand, the inert gas supplied from the intake port 24 of the gas flowing tube 23 flows through the inside of the gas flowing tube 23 into the intake hole 26, and then flows into the second space portion 21B. Further, the inert gas that has flowed into the second space portion 21B is discharged into the gas flowing tube 23 from the exhaust hole 27, and then flows into the discharge pipeline system 42 through the exhaust port 25.

Further, the inert gas supplied from the intake port 33 of the seal chamber 8 flows into the seal chamber 8. The inert gas that has flowed into the seal chamber 8 reaches the exhaust port 34 of the seal chamber 8, and then flows into the discharge pipeline system 42 through the exhaust port 34.

The gas flowing device 9 of the present embodiment includes a pressure control section 45 which sets the supply pressure of the inert gas to a pressure higher than the in-furnace pressure.

The pressure control section 45 includes control valves 46 and 47 respectively provided to the pipeline systems 41 and 42, and a differential pressure gauge 48 which controls the opening degree of each of the control valves 46 and 47. The differential pressure gauge 48 includes a first measurement pipe 49 which leads to the inside of the furnace and a second measurement pipe 50 which leads to the discharge pipeline system 42. Based on a differential pressure $\Delta P$ (=P1−P2) being the difference between an in-furnace pressure P1 and an in-device pressure (pressure of the seal chamber 8) P2 detected by means of measurement pipes 49 and 50, the differential pressure gauge 48 adjusts the opening degree of each of the control valves 46 and 47.

Specifically, when the differential pressure $\Delta P$ has become higher than or equal to a predetermined set value (for example, 100 kPa), the differential pressure gauge 48 reduces the opening degree of the control valve 46 of the supply pipeline system 41 and increases the opening degree of the control valve 47 of the discharge pipeline system 42, thereby decreasing the differential pressure $\Delta P$ to make it closer to the set value.

On the contrary, when the differential pressure $\Delta P$ has become lower than the set value, the differential pressure gauge 48 increases the opening degree of the control valve 46 of the supply pipeline system 41 and reduces the opening degree of the control valve 47 of the discharge pipeline system 42, thereby increasing the differential pressure $\Delta P$ to make it closer to the set value.

In this manner, the pressure control section 45 performs pressure control that adjusts the opening degree of each of the control valves 46 and 47 such that the differential pressure $\Delta P$ between the in-device pressure P2 and the in-furnace pressure P1 is always maintained at the predetermined set value.

Accordingly, the inert gas supplied from the supply pipeline system 41 always has a pressure slightly higher than the in-furnace pressure P1 by the set value, and thus, it is ensured that the inert gas that has flowed into the first space portion 21 flows into the furnace.

[In-furnace Temperature Measurement Method]

Next, an in-furnace temperature measurement method performed by use of the measurement device 1 of the present embodiment will be described with reference to FIG. 1 and FIG. 2.

First, in the present embodiment, the gas flowing device 9 is operated in advance, irrespective of the position in the axial direction of the sensor protection tube 4. Accordingly, the internal pressure P2 of each of the space portions 21A and 21B in the support tube 3 and the seal chamber 8 is held at a pressure higher than the in-furnace pressure P1 in advance, whereby the sealed state in which the atmospheric gas in the furnace is hermetically sealed is maintained.

In a period of time in which measurement of the in-furnace temperature is not necessary, the position in the axial direction of the sensor protection tube 4 is set to be a standby position (position shown in FIG. 1) at which the entirety of the cover cylinder 14 is housed in the measurement hole 2A of the furnace wall 2.

Next, upon arrival of a timing when measurement of the in-furnace temperature is necessary, the driving device 7 moves the sensor protection tube 4 along the axial direction to the furnace side, and sets the sensor protection tube 4 at a temperature-measuring position (position shown in FIG. 2) at which the cover cylinder 14 protrudes from the measurement hole 2A into the furnace, and then measurement of the in-furnace temperature is started at this temperature-measuring position.

It should be noted that the combustion control section described above calculates an in-furnace temperature from a voltage change detected by the temperature sensor 5 at the temperature-measuring position at which the cover cylinder 14 protrudes into the furnace, and performs is feedback control of the combustion amount of the coal gasification furnace based on the calculated in-furnace temperature.

Then, when the measurement of the in-furnace temperature has been completed, the driving device 7 moves the sensor protection tube 4 along the axial direction to the furnace-opposite side to return the sensor protection tube 4 to the original standby position, and holds the position in the axial direction of the sensor protection tube 4 at the standby position until the next temperature measurement timing comes.

Meanwhile, in the above measurement method, in a case where the sensor protection tube 4 is caused to protrude to the temperature-measuring position or caused to be withdrawn to the standby position, if the moving speed in the axial direction of the sensor protection tube 4 is too fast and the protruding or withdrawing thereof is performed instantly, an abrupt temperature change occurs in the cover cylinder 14, which may cause damage of the cover cylinder 14 due to thermal shock.

Thus, when performing the measurement method described above, it is preferable that the moving speed of the sensor protection tube 4 by the driving device 7 is set to a speed low enough (for example, in the case of pure chromium, 1 to 200 mm/second) not to cause damage of the cover cylinder 14 due to thermal shock.

Further, in FIG. 1, at the standby position, the leading end edge of the cover cylinder 14 is aligned to the inner surface of the furnace wall 2. However, a position at which the leading end edge of the cover cylinder 14 is withdrawn further to the furnace-opposite side than the inner surface of the furnace wall 2 (for example, a position at which the leading end edge of the cover cylinder 14 is withdrawn to the inside of the support tube 3) may be set as the standby position.

In this case, preferably, in the range in the axial direction up to where the leading end edge of the cover cylinder 14 reaches the inner surface of the furnace wall 2, the moving speed of the sensor protection tube 4 is set to a relatively high speed, and in the range in the axial direction where the cover cylinder 14 protrudes from the inner surface of the furnace wall 2, the moving speed of the sensor protection tube 4 is set to the low speed described above. If the moving speed of the sensor protection tube 4 is switched in this manner, increase of moving time associated with shifting the standby position of the cover cylinder 14 toward the furnace-opposite side can be suppressed.

[Effect of Measurement Device of the Present Embodiment]

As described above, according to the measurement device 1 of the present embodiment, the cover cylinder 14 of the sensor protection tube 4 is driven so as to be able to advance and retract in the axial direction with respect to the inside of the furnace through the measurement hole 2A, while maintaining the sealed state by the seal member 6. Therefore, the cover cylinder 14 of the sensor protection tube 4 can be advanced into and retracted from the furnace, without leaking the atmospheric gas in the furnace to the outside.

This allows an in-furnace temperature measurement method in which the cover cylinder 14 of the sensor protection tube 4 is caused to protrude into the furnace only when necessary, and in the other period of time, the cover cylinder 14 is caused to be withdrawn to a standby position outside the furnace. By employing this measurement method, a long life of the sensor protection tube 4 can be realized.

Further, according to the measurement device 1 of the present embodiment, the cover cylinder 14 has a corrosion resistance higher than that of the body part 13. Thus, durability of the leading-end portion of the sensor protection tube 4 which is exposed in the furnace during temperature measurement is improved, and even if the cover cylinder 14 is damaged, it is sufficient to remove the cover cylinder 14 from the body part 13 to be replaced. Thus, maintenance costs of the measurement device 1 can be advantageously reduced compared with a case where the entirety of the sensor protection tube 4 is replaced.

According to the measurement device 1 of the present embodiment, the first and second seal rings 6A and 6B are arranged at an interval in the axial direction. Thus, relative movement in the axial direction of the sensor protection tube 4 relative to the support tube 3 is smoothly performed without causing any trouble.

Further, according to the measurement device 1 of the present embodiment, the gas flowing device 9 supplies inert gas having a pressure higher than the in-furnace pressure P1 to the first space portion 21A to cause it to flow to the furnace side. Accordingly, the first seal ring 6A is not directly exposed to the atmospheric gas in the furnace, and thus the first seal ring 6A is not damaged soon.

Further, the gas flowing device 9 causes inert gas having a pressure higher than the in-furnace pressure P1 to flow also in the second space portion 21B. Accordingly, even if the first seal ring 6A is damaged, the sealed state between the support tube 3 and the sensor protection tube 4 is maintained by the next second seal ring 6B. Therefore, gas leak from the inside of the furnace can be prevented more assuredly.

It should be noted that the inert gas flowing in each of the space portions 21A and 21B also has a function of air-cooling the support tube 3 and the sensor protection tube 4. Through this air-cooling, thermal damage of each of the seal rings 6A and 6B can be effectively prevented.

Further, the measurement device 1 of the present embodiment is provided with the seal chamber 8 which is expandable and which hermetically isolates, from the outside, the base end side opening of the gap between the support tube 3 and the sensor protection tube 4. In addition, the gas flowing device 9 causes inert gas having a pressure higher than the in-furnace pressure P1 to flow also in the seal chamber 8. Therefore, gas leak from the base end side opening of the gap can be prevented almost completely.

The measurement device 1 of the present embodiment has employed a configuration in which: the support tube 3 is divided into the furnace wall tube part 3A on the furnace side and the connection tube part 3B on the furnace-opposite side; and the tube parts 3A and 3B are coaxially connected to each other via the joint flanges 12.

Accordingly, if the connection tube part 3B is separated from the furnace wall tube part 3A, substantially the entirety of the measurement device 1 can be removed from the furnace wall tube part 3A, and thus, attachment and detachment of the measurement device 1 to and from the furnace wall 2 is easy.

Further, the measurement device 1 of the present embodiment has employed a configuration in which a through hole in the movable wall portion 30 of the seal chamber 8 is hermetically closed by means of the attachment flange 32 provided at the pass-through portion of the sensor protection tube 4. Accordingly, by removing the attachment flange 32 from the movable wall portion 30, only the sensor protection tube 4 can be pulled out to the furnace-opposite side.

Therefore, maintenance operations for the sensor protection tube 4 such as replacing operations of a deteriorated cover cylinder 14 can be performed easily.

[First Modification]

Figure 5:
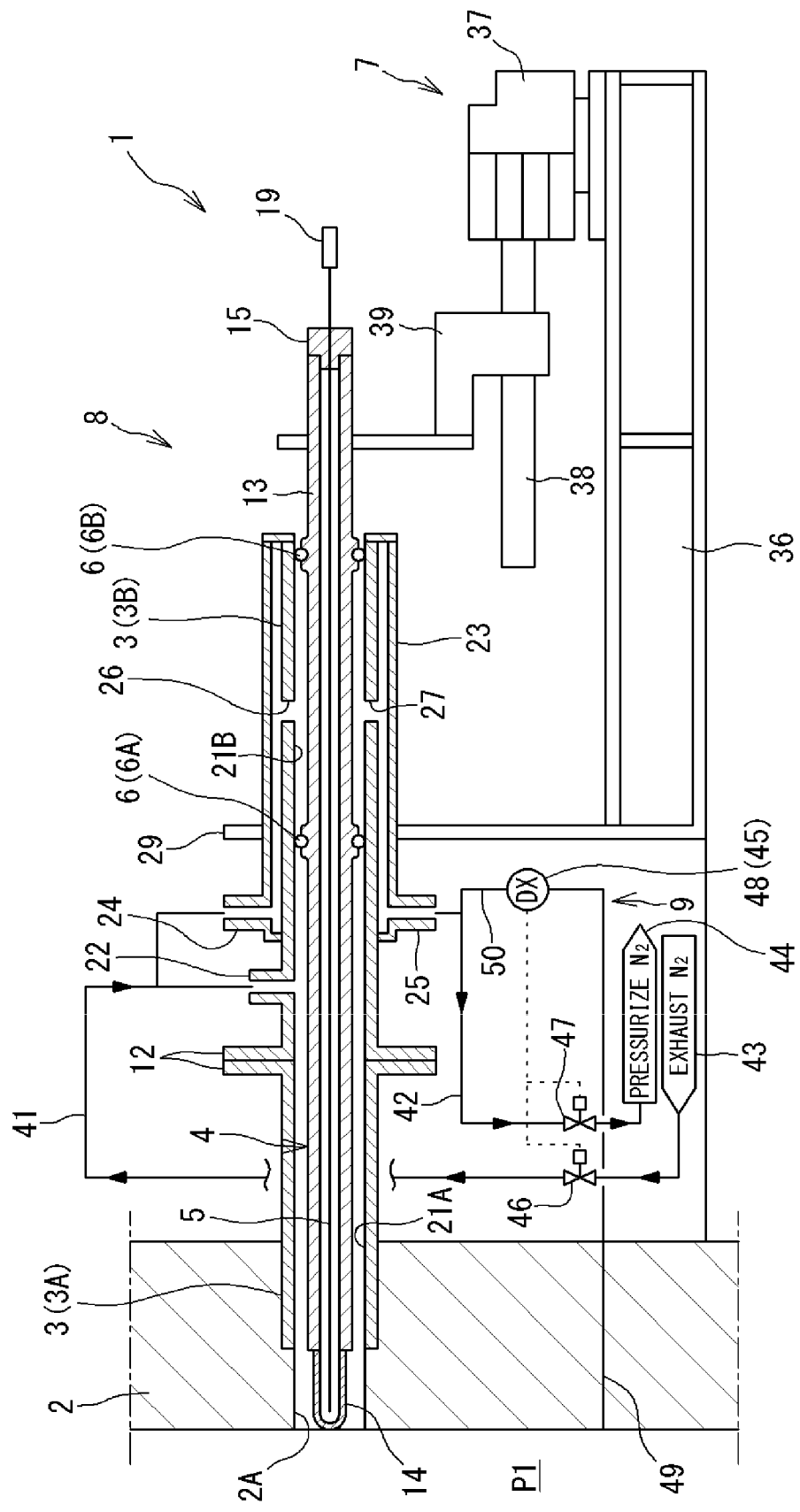
FIG. 5 is a side cross-sectional view of the in-furnace temperature measurement device according to a first modification.

FIG. 5 is a side cross-sectional view of the in-furnace temperature measurement device 1 according to a first modification of the above embodiment.

The difference between the measurement device 1 of this modification and the measurement device 1 (FIG. 1 and FIG. 2) of the above embodiment is that the seal chamber 8 is omitted while the gas flowing device 9 is maintained.

Since the seal chamber 8 is omitted, inert gas is supplied only to each of the space portions 21A and 21B in the support tube 3 from the supply pipeline system 41 of the gas flowing device 9, and the inert gas that has flowed into the space portion 21B is discharged via the discharge pipeline system 42.

Also in the measurement device 1 of the first modification, as in the embodiment described above, a plurality of (two in the example shown in FIG. 5) seal rings 6A and 6B are arranged at an interval in the axial direction in the gap between the support tube 3 and the sensor protection tube 4. Therefore, in that relative movement in the axial direction of the sensor protection tube 4 relative to the support tube 3 is smoothly performed without causing any trouble, the measurement device 1 of the first modification exhibits operational effects similar to those of the measurement device 1 of the above embodiment.

Since other configurations of the measurement device 1 of the first modification are similar to those of the measurement device 1 of the above embodiment, such configurations in FIG. 5 are denoted by the same reference characters as those in FIG. 1, and detailed description thereof are omitted.

[Second Modification]

Figure 6:
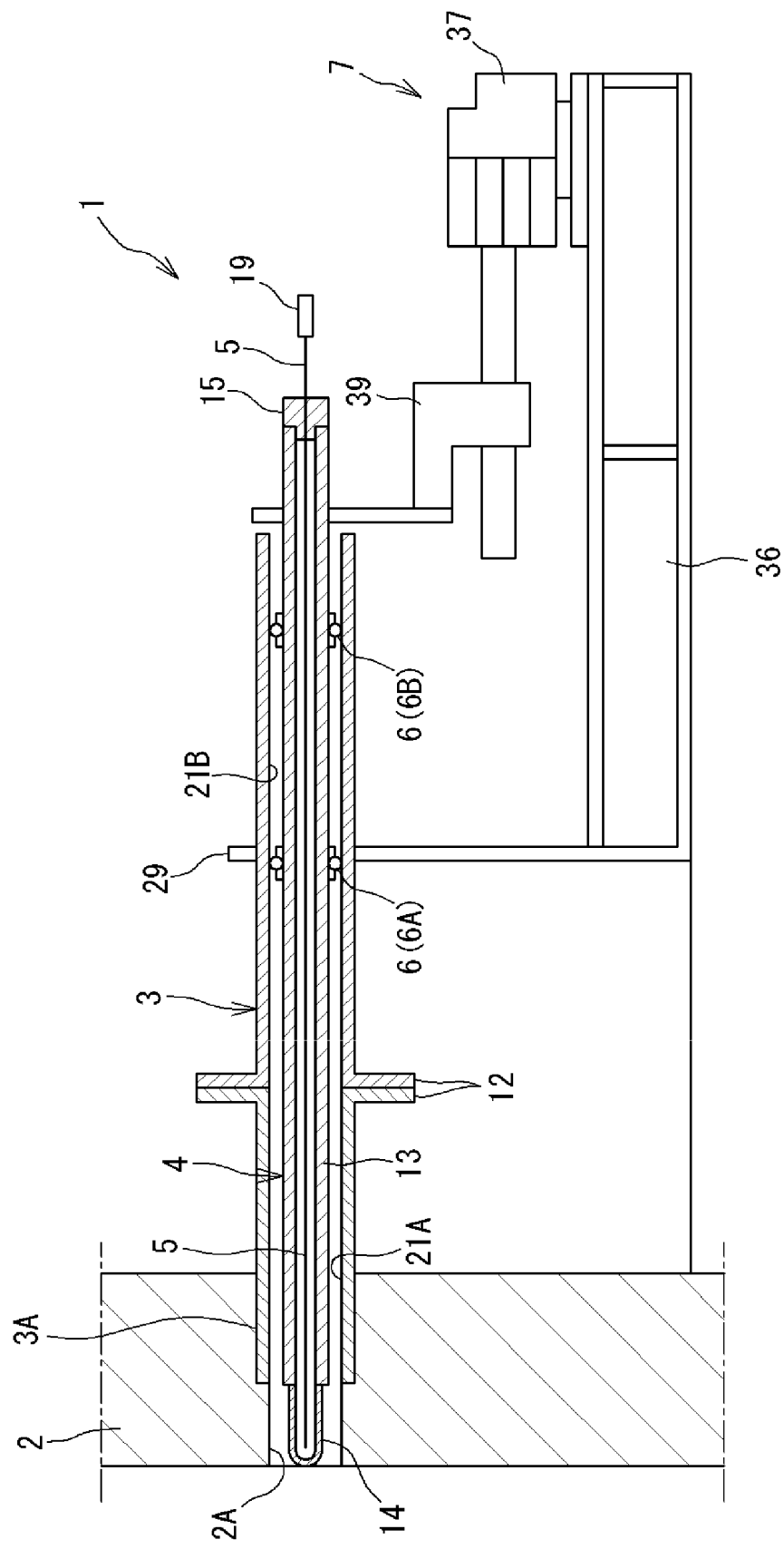
FIG. 6 is a side cross-sectional view of the in-furnace temperature measurement device according to a second modification.

FIG. 6 is a side cross-sectional view of the in-furnace temperature measurement device 1 according to a second modification of the above embodiment.

The difference between the measurement device 1 of this modification and the measurement device 1 (FIG. 1 and FIG. 2) of the above embodiment is that both of the seal chamber 8 and the gas flowing device 9 are omitted.

Also in the measurement device 1 of the second modification, as in the embodiment described above, a plurality of (two in the example shown in FIG. 6) seal rings 6A and 6B are arranged at an interval in the axial direction in the gap between the support tube 3 and the sensor protection tube 4. Therefore, in that relative movement in the axial direction of the sensor protection tube 4 relative to the support tube 3 is smoothly performed without causing any trouble, the measurement device 1 of the second modification exhibits operational effects similar to those of the measurement device 1 of the above embodiment.

Since other configurations of the measurement device 1 of this modification are similar to those of the measurement device 1 of the above embodiment, such configurations in FIG. 6 are denoted by the same reference characters as those in FIG. 1, and detailed description thereof are omitted.

[Third Modification]

Figure 7:
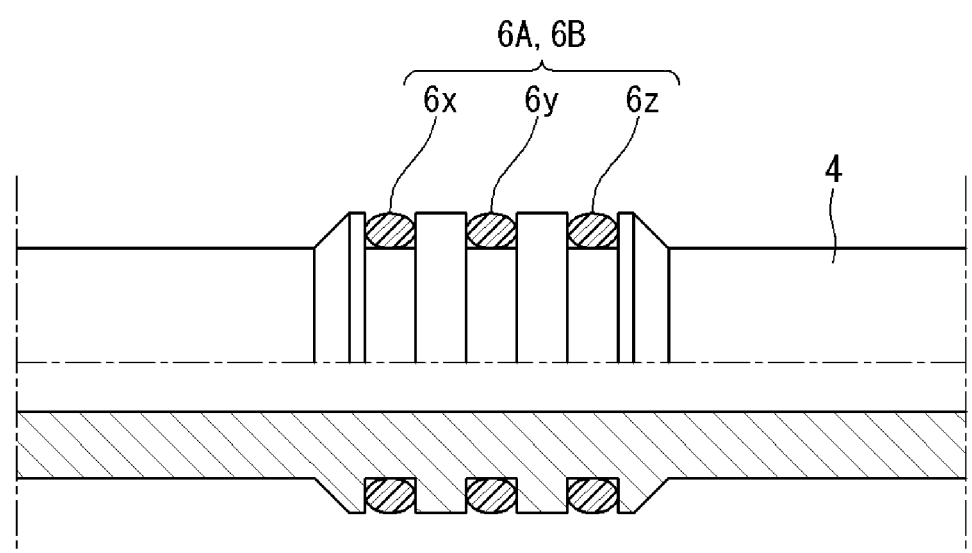
FIG. 7 is a partial enlarged view of a sensor protection tube showing a modification of a seal ring.

FIG. 7 is a partial enlarged view of the sensor protection tube 4 showing a modification of the seal rings 6A and 6B.

In the embodiment described above (including the first and second modifications), the plurality of seal rings 6A and 6B which hermetically seal the gap between the support tube 3 and the sensor protection tube 4 are each formed by one rubber ring. However, as shown in FIG. 7, a plurality of rubber rings 6x, 6y, and 6z provided adjacent to each other in the axial direction may form one seal portion.

That is, in the example shown in FIG. 7, triple peripheral grooves slightly apart from each other in the axial direction are formed on the outer peripheral surface of the sensor protection tube 4, and the rubber rings 6x, 6y, and 6z are fitted in the three peripheral grooves, respectively.

As shown in FIG. 7, if the seal rings 6A and 6B defining the space portions 21A and 21B are each formed by double or more rubber rings such as the rubber rings 6x, 6y, and 6z, airtightness between the space portions 21A and 21B can be more assuredly enhanced than in the embodiment described above where the seal rings 6A and 6B are each formed by one rubber ring.

[Fourth Modification]

In the embodiment described above (including the first to third modifications), as each of the seal rings 6A and 6B, a rubber ring made of fluorocarbon rubber is employed. However, other than this, a rubber ring made of silicone rubber, chloroprene rubber, nitrile rubber, or the like may be employed.

The usable temperature ranges of these materials are as follows.

fluorocarbon rubber: −50 to 300° C.
silicone rubber: −120 to 280° C.
chloroprene rubber: −60 to 120° C.
nitrile rubber: −50 to 120° C.

When the above usable temperature ranges are compared with each other, fluorocarbon rubber has the highest upper limit (=300° C.), and thus, is most appropriate for the in-furnace temperature measurement device 1 of the present invention. However, the positions in the axial direction of the plurality of seal rings 6A and 6B may be respectively determined in accordance with the material of the rubber rings to be used.

For example, in the case of chloroprene rubber or nitrile rubber, the upper limit of the usable temperature range is 120° C. Thus, in a case where either of these materials is used, it is sufficient that the seal rings 6A and 6B are provided at positions, in the axial direction of the sensor protection tube 4, at which temperatures are lower than or equal to the upper limit temperature thereof even during the operation of the measurement device 1.

As described above, if the seal rings 6A and 6B are provided at positions, in the axial direction of the sensor protection tube 4, at which temperatures are lower than or equal to the upper limit value of the usable temperature range of an elastomer material employed for the seal rings 6A and 6B, the temperature of the employed elastomer material does not exceed the usable temperature range during the operation of the measurement device 1. Thus, it is possible to prevent in advance the seal rings 6A and 6B from being damaged soon by being exposed to a high temperature higher or equal to the upper limit value.

[Other Modifications]

The above embodiment is all illustrative and does not limit the scope of the present invention. The scope of the present invention is indicated by the appended claims, and all changes which come within equivalency and configuration of the claims are therefore intended to be embraced therein.

For example, in the above embodiment, an exemplary case where the measurement device 1 of the present invention is applied to a coal gasification furnace has been described. However, the measurement device 1 of the present invention can be generally applied to a furnace in which gas is generated, and may be used in a gasification furnace for fuel other than coal, or in a combustion furnace which simply burns the fuel.

Further, in the above embodiment, the number of the seal rings 6A and 6B provided between the support tube 3 and the sensor protection tube 4 is not limited to two as shown in the examples in the drawings, but may be only one, or three or more.

Further, as the seal member 6 for the gap between the support tube 3 and the sensor protection tube 4, not only the seal rings 6A and 6B but also a refractory such as glass wool filled in the gap as shown, for example, in Patent Literature 1 (Japanese Laid-Open Patent Publication No. 2005-43057) may be used.

[Other Disclosure]

Although the scope regarding the in-furnace temperature measurement device of the present invention is defined by the claims, the in-furnace temperature measurement method using the device is defined as follows.

(Measurement Method 1)

A method for measuring an in-furnace temperature by inserting a sensor protection tube housing a temperature sensor, into a support tube connected to a measurement hole which leads to an inside of a furnace, and by causing a leading-end portion of the sensor protection tube to protrude into the furnace through the measurement hole, the method including:

a first step of causing the leading-end portion of the sensor protection tube to stand by at a standby position outside the furnace in a state where a gap between the support tube and the sensor protection tube are hermetically sealed;

a second step of moving the sensor protection tube to a furnace side along an axial direction to cause the leading-end portion thereof to protrude into the furnace, to measure an in-furnace temperature, while maintaining a sealed state of the gap; and a third step of moving the sensor protection tube having completed temperature measurement to an furnace-opposite side along the axial direction, to return the sensor protection tube to the standby position being an original position, while maintaining the sealed state of the gap.

According to the measurement method 1, the sensor protection tube is moved to the furnace side along the axial direction, the leading-end portion thereof is caused to protrude into the furnace, and the in-furnace temperature is measured, while the sealed state of the gap is maintained (second step); and the sensor protection tube having completed temperature measurement is moved to the furnace-opposite side along the axial direction, to be returned to the standby position being the original position, while the sealed state of the gap is maintained (third step). Therefore, compared with a conventional measurement method in which the leading-end portion of a sensor protection tube is always exposed in the furnace, a long life of the sensor protection tube can be realized.

(Measurement Method 2)

In the measurement method 1, it is preferable that the moving speed of the sensor protection tube in the second and third steps is set to a speed low enough not to cause damage of the leading-end portion of the protection tube due to thermal shock.

This is because if the moving speed of the sensor protection tube is set to such a low speed as described above, it is possible to prevent in advance unanticipated damage of the protection tube associated with causing the leading-end portion of the sensor protection tube to advance into and retract from the furnace.

(Measurement Method 3)

In each step of the measurement method 1 or 2, it is preferable that inert gas having a higher pressure than the in-furnace pressure is flowed in the space portion positioned on the furnace side of the most-furnace-side seal ring.

Accordingly, since the inert gas flowing in the space portion enters the furnace from the space portion through the measurement hole, damage of the most-furnace-side seal ring caused by being directly exposed to the gas atmosphere in the furnace can be prevented in advance.

DESCRIPTION OF THE REFERENCE CHARACTERS in-furnace temperature measurement device
2 furnace wall
2A measurement hole
3 support tube
4 sensor protection tube
5 temperature sensor
6 seal member
6A first seal ring
6B second seal ring
7 driving device (drive mechanism)
8 seal chamber
9 gas flowing device (gas flowing mechanism)
13 body part
14 cover cylinder
21A first space portion
21B second space portion

The invention claimed is:

1. An in-furnace temperature measurement device for a furnace in which gas is generated, the in-furnace temperature measurement device comprising:
    a support tube which communicates with a measurement hole which leads to an inside of the furnace;
    a sensor protection tube inserted into the support tube so as to be movable in an axial direction with a leading end, of the sensor protection tube, facing a furnace side;
    a plurality of seal rings which hermetically seal a gap between the support tube and the sensor protection tube and which are arranged at an interval so as to divide the gap into a plurality of space portions in the axial direction;
    a temperature sensor housed in the sensor protection tube such that a temperature-sensing portion of the temperature sensor corresponds to a leading-end portion of the sensor protection tube;
    a drive mechanism which drives the leading-end portion of the sensor protection tube so as to be able to advance and retract in the axial direction with respect to the inside of the furnace through the measurement hole, while maintaining a sealed state by the seal rings; and
    a gas flowing mechanism which causes inert gas having a higher pressure than an in-furnace pressure to flow into each of the space portions which are positioned on the furnace side of the respective seal rings.

2. The in-furnace temperature measurement device according to claim 1, wherein
    the leading-end portion of the sensor protection tube has a corrosion resistance higher than that of a body part of the sensor protection tube, the body part being a part of the sensor protection tube other than the leading-end portion, and is formed by a cover cylinder which can be coaxially and detachably mounted to the body part.

3. The in-furnace temperature measurement device according to claim 1, further comprising:
    a seal chamber which hermetically isolates a base end side opening of the gap from outside, wherein
    the gas flowing mechanism has a flow path which allows the inert gas to flow also in the seal chamber.

4. The in-furnace temperature measurement device according to claim 1, wherein
    the seal rings are formed from any one of fluorocarbon rubber, silicone rubber, chloroprene rubber, and nitrile rubber.

5. The in-furnace temperature measurement device according to claim 1, wherein
    the seal rings are provided at positions, in the axial direction of the sensor protection tube, where temperatures are lower than or equal to an upper limit value of a usable temperature range of an elastomer material employed for the seal rings.

6. The in-furnace temperature measurement device according to claim 1, wherein
    the seal rings are each formed by a plurality of rubber rings provided adjacent to each other in the axial direction.

* * * * *